May 27, 1930. K. E. PEILER 1,760,435
SHEAR MECHANISM FOR GLASS FEEDERS
Original Filed Dec. 31, 1923   9 Sheets-Sheet 1

INVENTOR
Karl E. Peiler
By Robert S. Brown
ATTORNEY

May 27, 1930. K. E. PEILER 1,760,435
SHEAR MECHANISM FOR GLASS FEEDERS
Original Filed Dec. 31, 1923    9 Sheets-Sheet 4

INVENTOR
Karl E. Peiler
By Robson D. Brown
ATTORNEY

May 27, 1930.　　　　K. E. PEILER　　　　1,760,435
SHEAR MECHANISM FOR GLASS FEEDERS

Original Filed Dec. 31, 1923　　9 Sheets-Sheet 5

INVENTOR
Karl E. Peiler
By Robson D. Brown
ATTORNEY

May 27, 1930.  K. E. PEILER  1,760,435
SHEAR MECHANISM FOR GLASS FEEDERS
Original Filed Dec. 31, 1923   9 Sheets-Sheet 8

May 27, 1930. K. E. PEILER 1,760,435
SHEAR MECHANISM FOR GLASS FEEDERS
Original Filed Dec. 31, 1923  9 Sheets-Sheet 9

Patented May 27, 1930

1,760,435

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

SHEAR MECHANISM FOR GLASS FEEDERS

Original application filed December 31, 1923, Serial No. 683,576. Divided and this application filed November 18, 1925. Serial No. 69,803.

This application is a division of my copending application for Letters Patent, Serial No. 683,576, filed December 31, 1923. The present application is filed for the purpose of claiming certain novel features which are shown and described in the original application, particularly the glass-severing shears and their operating mechanism.

The specification which follows comprises an exact copy of portions of the specification of the original application, Serial No. 683,576, and the drawings consist of reproductions of certain figures of the drawings of the original application.

This invention relates to apparatus for feeding molten glass from a melting tank, furnace or other container, to the molds of a shaping machine.

The general object of the invention is to provide a new and improved apparatus for this purpose, which will supply and deliver molten glass in the best form and condition for use in the associated shaping machine. A more specific object is to provide such an apparatus having improved mechanisms for controlling the discharge of glass from an outlet, suspending it therefrom, and separating the suspended glass into mold charges of controlled size, shape, and condition suited for the molds to which they are delivered either directly or by means of a suitable chute or conveyor.

These and other features of the invention will best be understood from the following description, and from the accompanying drawings of a preferred embodiment of the invention, in which:—

This embodiment of my invention comprises a forehearth connected to a glass melting tank or furnace and provided with a discharge outlet, together with mechanism for discharging the glass periodically, accumulating each discharge at the outlet to form it into a mold charge, and severing the charge.

The forehearth preferably comprises a bowl or discharge chamber 54, provided with suitable covers, casings, supports and temperature control means.

The glass flowing from the furnace and through the forehearth tends to be hotter on top and progressively colder toward the bottom. It also tends to be colder at the sides of the forehearth than at the center line. This is because of the temperature variation between upper and lower layers in the furnace and because of the cooling influence of the bottom and side walls of the forehearth. The insulation 82 helps to minimize this influence and so to minimize cold streaks in the glass.

The glass discharging from the bowl 54 passes between the bottom of a tube 146 and the top of a curb 147 (see Fig. 1) surrounding and forming a part of a well 148 in the bottom of the bowl. Means are provided for adjusting the tube vertically to regulate the quantity of glass discharged, or to seat the tube on the top of the curb, close enough to stop the discharge of glass, as will be described later.

The glass is discharged from the well 148 through an outlet ring 149 (Fig. 1) surrounded by insulating material 82 enclosed in a metal casing 150 by which the ring is supported. The lower edge of the ring is provided with a reduced shouldered portion which is received and positioned by the casing. The casing is similarly positioned and supported beneath the well 148 by a carrier 151 (Fig. 1) pivotally mounted on the bowl casing 93.

The outlet rings are changed occasionally in the use of the apparatus, to replace rings which have become worn, or to change the size of the orifice in accordance with the ware being made. The connection between the upper surface of the outlet ring and the bottom of the well 148 is made glass tight by the use of a suitable packing, such as clay, which is applied in plastic condition. These rings are often replaced while the apparatus is hot, and, therefore, it is necessary that the new ring shall be quickly and accurately positioned as the clay packing sets quickly under the action of heat. Therefore, provision is made for forcing the outlet ring up into position quickly and forcibly. For this purpose, the carrier 151 is provided with a depending ledge 152 (Fig. 1) having a hole 153 to receive the reduced end of a bar 154 shown in broken lines in Fig. 1 extending through an apertured lug 155 of the bowl casing 93, which forms a fulcrum for the bar. By this construction the outlet ring, which is definitely positioned in its case 150, may be placed in the opening of the carrier 151 while the carrier is swung down, and then the carrier may be swung quickly and forcibly up into exact position beneath the well by the use of the bar 154. Stops 156 are provided to limit the upward movement of the carrier, and latches 157 are arranged to be turned into position in engagement with the bottom of the carrier ledge 152 to hold it rigidly in position.

When the operation of the feeder is temporarily discontinued, it is desirable that the well 148 and the outlet ring 149 shall not be permitted to cool sufficiently to freeze the glass therein and prevent its flow when the operation of the machine is again commenced. For this purpose, a closure containing heat insulating material as shown in U. S. Patent No. 1,421,810 to Vergil Mulholland, but having improved means for positioning it beneath the orifice may be used.

Means are provided for diverting the discharged glass to a cullet receptacle when the glass is not suitable for use or is not to be delivered to the molds of the associated shaping machine. For this purpose, a chute 163 (Fig. 1) is supported below the orifice in such a manner that it may be moved into and out of position to intercept the discharging glass. The chute is carried by links 165 rigidly connected with a rod 166 pivotally mounted on the bottom of the bowl casing 93, and provided with a handle by which the chute may be moved to and from the two positions indicated.

The formation of the mold charges is controlled and regulated by the tube 146, a reciprocating plunger 172 projecting through the tube and the shear blades 173. An important feature of this invention is the operating mechanism for these implements which control the formation and suspension of the mold charges, including the various adjustments of which this mechanism is capable. The mechanism for operating and adjusting these parts is supported on the front of the forehearth, in or on a box 174 (Figs. 6 and 7) secured to a bracket 175 formed on side wall 57 of the forehearth.

Figure 7:
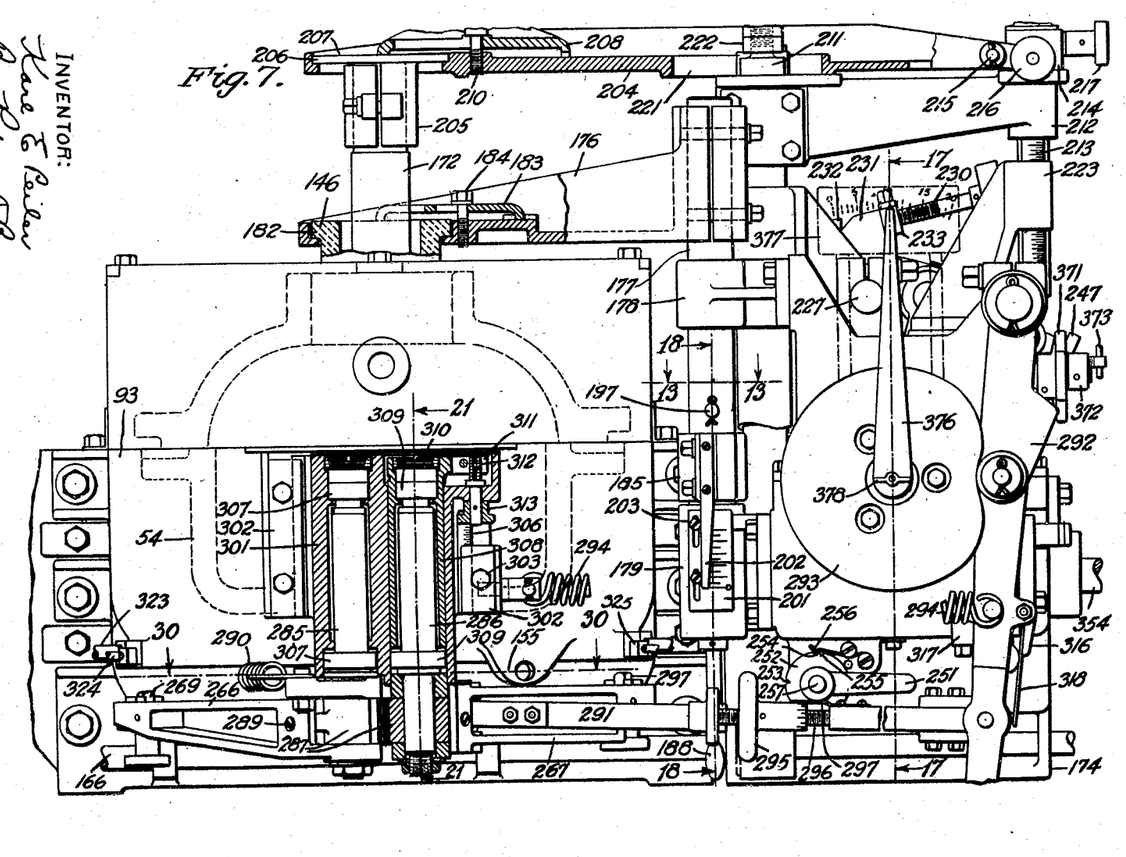

The tube 146 is carried by an arm 176 clamped to a tubular rod 177 movable vertically in bearings 178 and 179 (Fig. 7). The tube is removably secured in the arm 176 by a connection comprising a flange 182 (Fig. 7) on the upper end of the tube, seated in a recess in the arm. A forked clamp 183 holds the flange in its seat by means of a screw 184 passing through a slot in the clamp and threaded into the arm. One end of the slot may be enlarged to permit the passage of the screw head so that the clamp may be removed by loosening the screw and sliding the clamp to the right in Fig. 7, without removing the screw.

The rod 177 is held from rotary movement in the bearings 178 and 179, by an arm 185 fixed on the rod and carrying a pin 186 (Figs.

Figures 1, 3, 4:
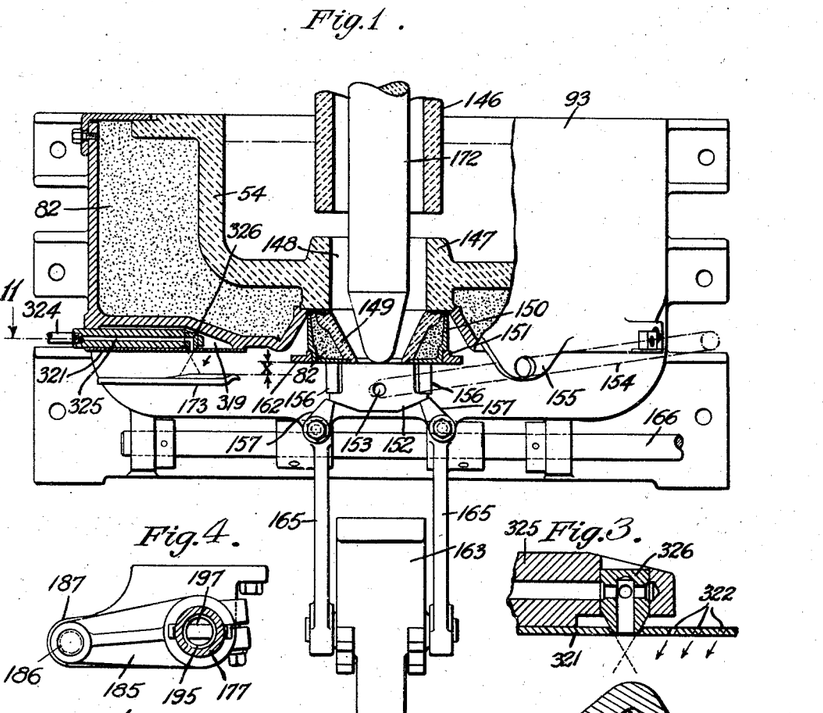
Fig. 1 is a front elevation, partly in section on the line 10—10 of Fig. 6, showing a portion of the glass feeding furnace forehearth and certain associate structural elements of the aforesaid original application, Serial No. 683,576, including certain structural features of the invention to be claimed herein.
Fig. 3 is an elevation in section on the line 12—12 of Fig. 2.
Fig. 4 is a plan view in section on the line 13—13 of Fig. 7.
Figure 5:
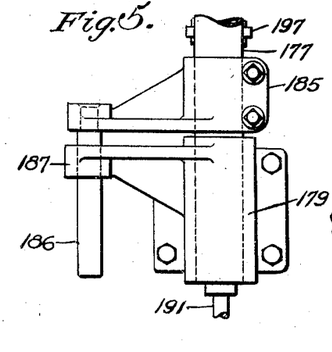
Fig. 5 is a front elevation projected from Fig. 4.
Figure 6:
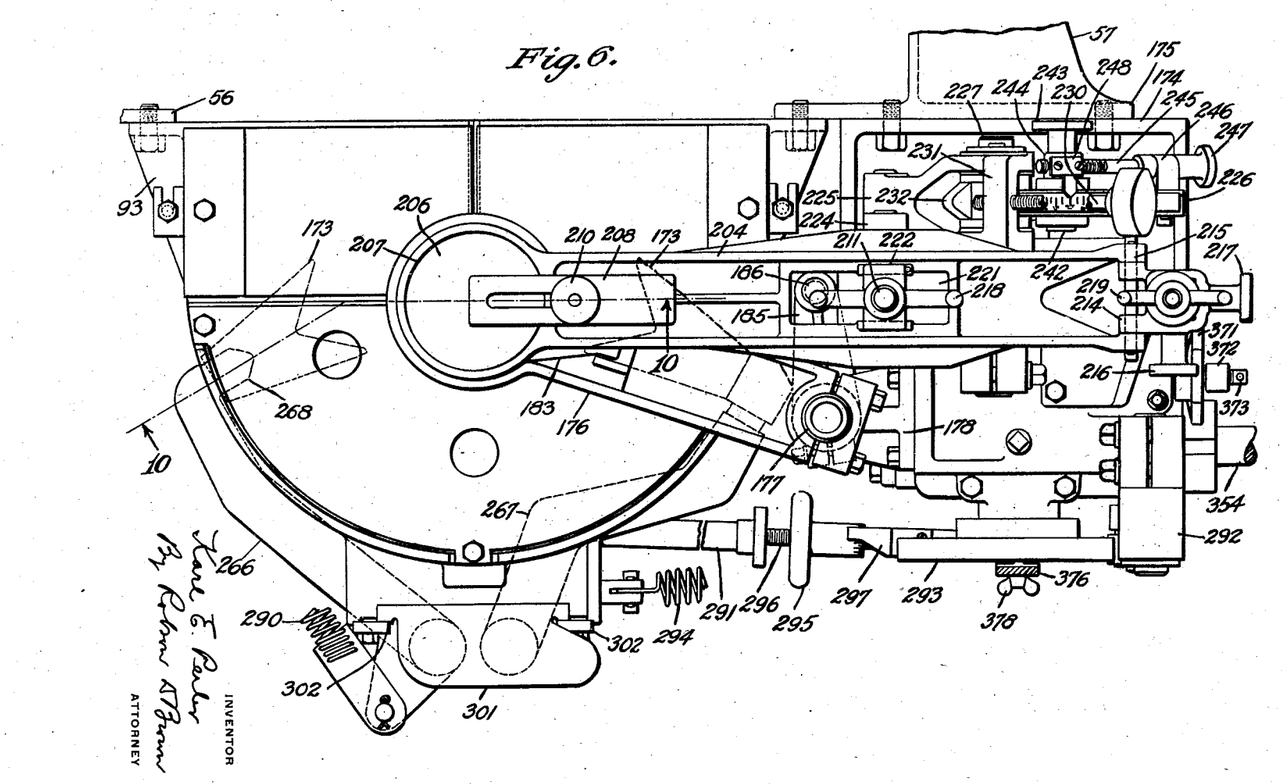
Fig. 6 is a plan view and Fig. 7 a front elevation of the operating mechanism, some of the parts being broken away or shown in section. In both these views the shear arms are shown in open position for greater clearness, their operating connections with their cam arm 292 being shown broken.

4, 5 and 6) sliding in a bracket 187 projecting from the bearing 179.

Figure 8:
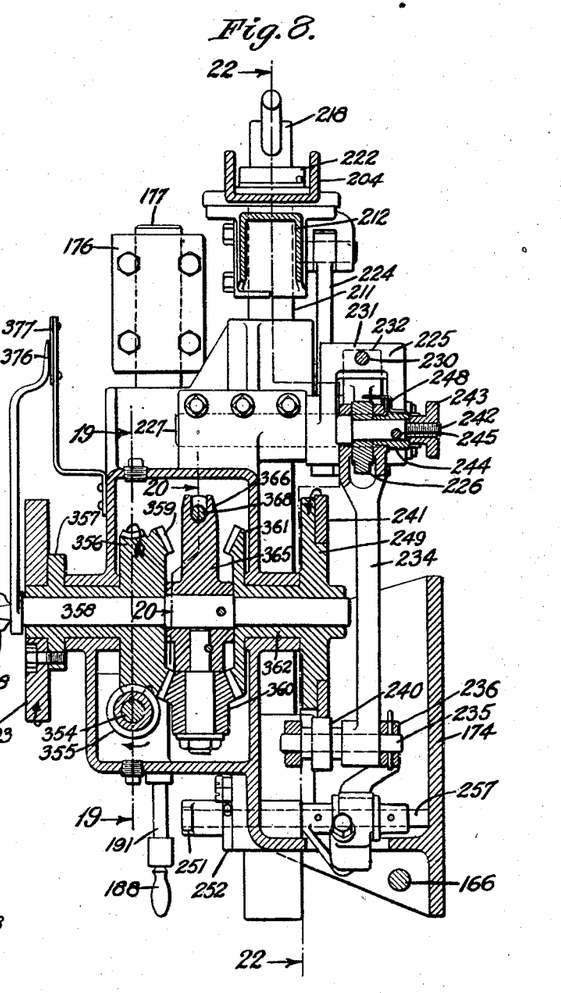
Fig. 8 is a side elevation in section on the line 17—17 of Fig. 7.
Figure 9:
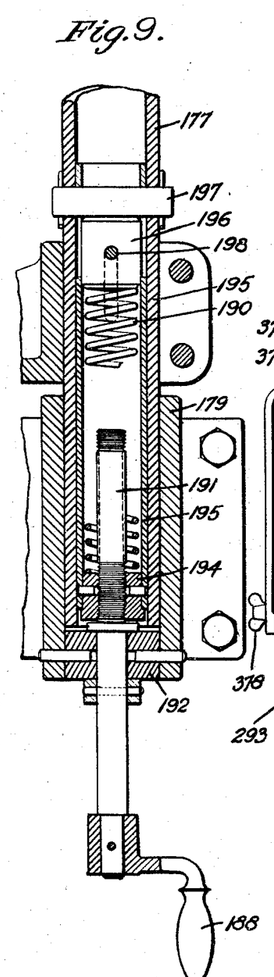
Fig. 9 is a partial side elevation in section on the line 18—18 of Fig. 7.

The tube 146 is adjusted vertically by screw 191 journaled in the bushing 192 of the bearing 179, and provided with a crank 188 (Figs. 8 and 9). The screw is threaded in a nut 194 fixed in the sleeve 195 slidable within the tubular rod 177. The pressure of the screw is transmitted to the rod 177 through the cushioning spring 190 disposed between the nut 194 and the plunger 196 which bears against a pin 197 fixed in the rod 177 (Fig. 9). The sleeve is slotted to permit it to slide relatively to the pin 197 and to the pin 198, the latter serving as a stop pin for the plunger 196. If the glass should be chilled enough to impede the movement of the tube 146, the spring 190 acts as a cushion in the connection between the tube and the nut 194, and raises the tube gradually without damaging it by the yielding but increasing pressure of the spring.

Inasmuch as some of the important operating implements or parts are submerged in the glass or are otherwise concealed from the sight of the operator, means are preferably provided for visibly indicating either absolutely or relatively the working positions or movements of the more important of these parts, preferably by graduated scales disposed in plain view of the operator. To thus visibly indicate the position of the lower end of the tube 146, a graduated scale 201 (Fig. 7) is attached to the bearing 179, and the pointer 202 is attached to the arm 185, which moves up and down with the tube 146. As these tubes may vary in length, the pointer or the scale, in this case the latter is provided with slots for receiving its holding screws 203, so that the scale may be adjusted vertically. The scale graduations preferably indicate the distance between the bottom end of the tube and the upper surface of the curb 147, the scale 201 being preferably adjusted so as to indicate zero when the tube is in its downward closed position upon the curb. Thus the operator knowing the spaces required between the end of the tube and the curb to feed the different desired weights of mold charge, is enabled by observation of the scale to set the tube at once to the correct positions without making repeated trials and readjustments of the tube.

The plunger 172 is arranged to be reciprocated periodically to assist in the formation of mold charges much as shown in various of my prior applications, and it is capable of various adjustments. The plunger is carried by an arm 204 (Figs. 6 and 7), and the connection between the plunger and the arm is such that the plunger may be easily removed without disturbing the adjustment of the arm. For this purpose, the upper end of the plunger is clamped in a removable chuck 205 having a circular plate 206 at its upper end which is received and supported in an opening 207 in the end of the arm 204, and held down on its seat by a clamp 208 pressed upon the plate by a hand screw 210. The clamp is slotted to receive the screw, so that when the screw is loosened, the clamp may be slid back from over the top of the plate 206, thereby permitting the plunger to be removed.

The arm 204 is guided for vertical reciprocation by a sliding rod 211, being adjustably clamped to a bracket 212 fixed to the upper end of the rod. This construction permits adjusting the arm 204 laterally in any direction, to centralize the plunger with the outlet ring, by sliding the arm on its bracket 212, or swinging it on the rod 211, or by a combination of these adjustments. The bracket 212 carries a post 213 projecting vertically on both sides of the bracket, the upper end being loosely embraced by a square collar 214 (Fig. 7) carrying a hinge pin 215, on which the arm 204 is mounted. The collar 214 and the parts connected therewith may be adjusted laterally with relation to the bracket 212 by means of hand screws 216 and 217 threaded into the post 213 at right angles to each other. Each screw passes through a horizontal slot in the collar in which it is held from longitudinal movement by suitable collars, so that by turning the screw 217 the collar and arm 204 may be adjusted longitudinally, and by turning the screw 216 the arm may be adjusted transversely by a swinging movement about the upper end of the rod 211. The arm 204 may be clamped in position after adjustment by a wing nut 218 threaded onto the top of the rod 211 and bearing on a clamp 222, and by a wing nut 219 on the top of the post 213. The rod 211 passes through a slot 221 (Fig. 6) in the arm 204, and when the nut 218 is loosened to permit adjustment of the position of the plunger, the arm may slide upon or pivot about the upper end of the rod 211. In order that the arm 204 may be swung upwardly on the hinge pin 215 without removing the nut 218, or the clamp 222 the nut is made of such size that it will pass through the slot 221, and the clamp 222 beneath the nut is of such proportions that when it is turned transversely of the arm, the ends of the clamp rest on the arm; but when the nut 218 is loosened, the clamp may be turned lengthwise of the arm, which permits it to be lifted without removing the nut or the clamp from the rod 211.

In order to prevent the rod 211 from turning, and thereby displacing the plunger, the lower end of the post 213 projects downwardly and is engaged in a bearing 223 (Fig. 7). The lower end of the post 213 may be provided with graduations if desired, which by their relation to the top of the bearing 223 indicate the vertical position of the plunger with respect to the outlet. The graduations are preferably arranged to indicate zero when the end of the plunger is in the plane of the final discharge outlet (Fig. 1), and to read above and below zero.

Means is provided for reciprocating the plunger, its carrying arm 204 and other associated parts, and provision is made for adjusting both the amplitude of reciprocation and the vertical positions of the end of the plunger relative to the outlet. A link 224 (Fig. 8), having its upper end pivotally connected with the bracket 212. and its lower end connected with an arm 225, is operated by a cam 241 on the shaft 358, by connections best shown in Fig. 22. The arms 225 and 226 are pivotally mounted on a stud 227, and are adjusted to different relative positions by a screw 230 threaded into a yoke 231 formed on the arm 225, and bearing against a tail 232 projecting from the arm 226. A threaded clamp 233 pinned loosely to the yoke 231 is provided to clamp the screw in adjusted position. The arm 226 is actuated by a link 234 connected by a stud 235 with a cam arm 236 mounted on a fixed pivot 237. The stud 235 carries a cam roll 240 (Fig. 8) in engagement with a cam 241 by which the parts are actuated. The cam disc 241 is removably secured to its drive shaft by means of a hub 249.

Adjustment of the screw 230. will change the relation between the arms 225 and 226, thereby raising or lowering the path of reciprocation of the plunger without changing its length of stroke. This adjustment permits the plunger at the lower end of its stroke to project into or through the outlet ring, or to remain above the ring as may be desired.

The means for adjusting the length of stroke of the plunger comprises an adjustable connection between the link 234 and the arm 226, which is slotted to receive a pin 242 (Fig. 8) carried by the forked upper end of the link 234. One end of the pin is threaded to receive a hand nut 243, bearing against a collar 244, which clamps the arm 226 between a head on the pin and the collar. The effective length of the lever formed by the arm 226 is adjusted by moving the pin 242 in the slot of the arm by means of a screw 245 threaded into the pin 242 and journaled in a pivoted block 246 (Fig. 6) mounted on the arm.

By turning a hand wheel 247 on the screw 245, the pin 242 may be slid in the slot so as to produce different lengths of plunger stroke, and in order that the stroke may be conveniently determined without experiment, a pointer 248 (Figs. 6 and 8) cooperates with a scale on the top of the arm 226, which indicates the lengths of the plunger stroke produced by the various settings of the pointer 248. It is preferred that the slot in the arm 226 shall be formed on an arc struck from the stud 235 forming the lower pivot of the link 234 when the cam 241 is in such position that the plunger is at the bottom of its stroke, whereby the adjustments in the length of the plunger stroke vary the upper end of the stroke only, without changing the position of the lower end of the stroke, leaving that position to be changed only by adjustments of the screw 230.

Figures 21, 22, 23:
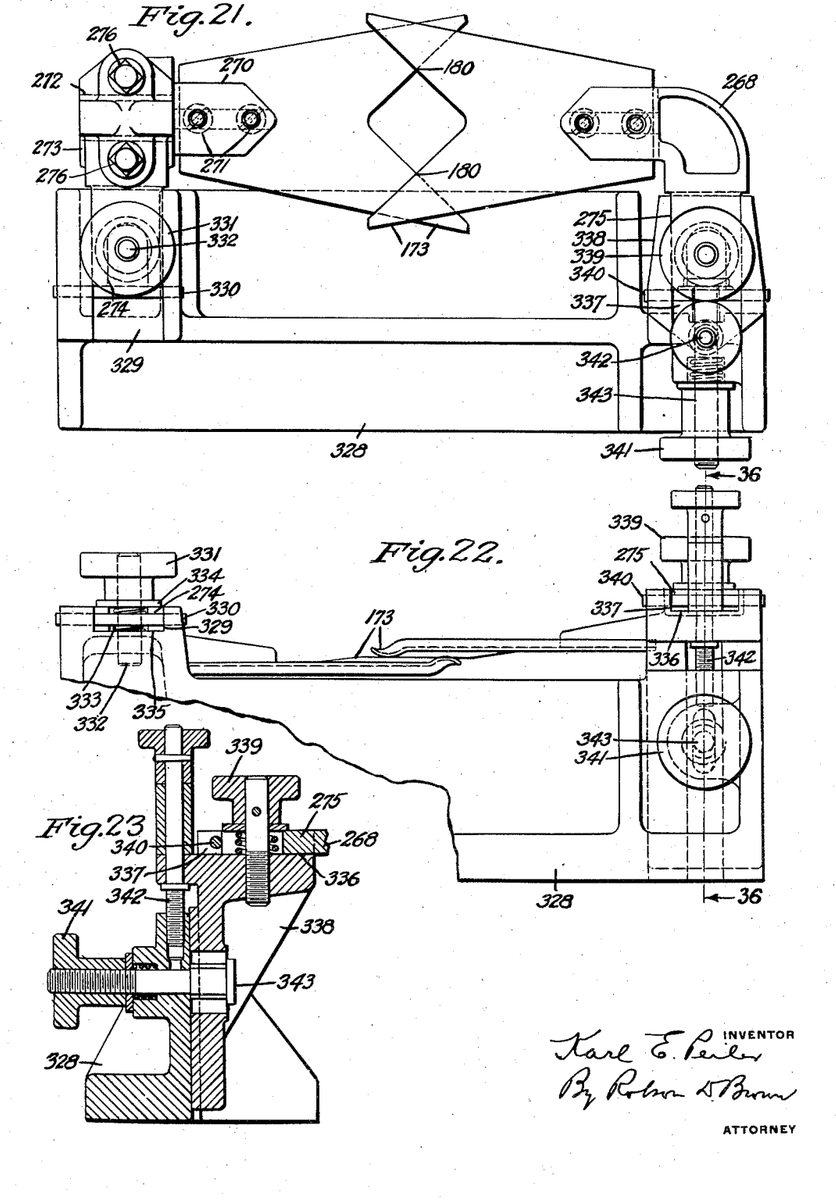
Fig. 21 is a plan view of the gauge for setting the shear blades.
Fig. 22 is a partial front elevation of the gauge.
Fig. 23 is a side elevation in section on the line 36—36 of Fig. 22.

For convenience in removing the cam 241, to permit the substitution of other cams having different shapes, it may be made in two parts removably secured to a flange, by screws or otherwise, as shown in Fig. 22.

It is desirable at times to hold the plunger inoperative in elevated position without stopping the operation of the entire apparatus. This may be done by turning a handle 251 (Fig. 7) capable of assuming three positions, one permitting the regular operation of the plunger, a second in which the plunger will be held inoperative at approximately its highest operating position, and a third in which it is elevated slightly above its highest operating position, to hold the cam roll 240 clear of the plunger operating cam 241. The handle is provided with a disk 252 having a series of notches 253, 254 and 255, the disk being turned so that its notches are selectively engaged by a spring detent 256 to hold it in any of these three positions.

The handle 251 is fixed on a shaft 257 mounted in suitable bearings in the box 174 (Fig. 8).

Figure 17:
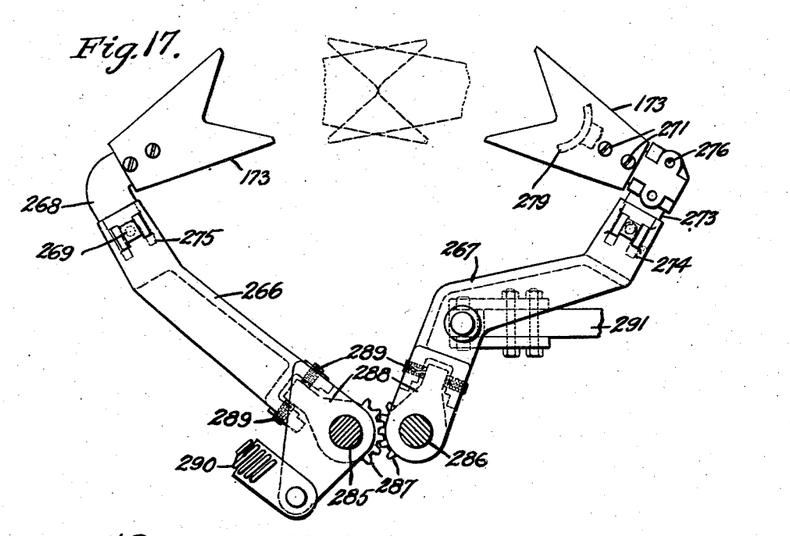
Fig. 17 is a plan view of the shear mechanism in section on the line 30—30 of Fig. 7.

The mold charge produced at each operation of the plunger is severed by shear mechanism operating in timed relation to the plunger mechanism. Shear blades 173 are mounted to reciprocate below the outlet ring 149, and provision is made for adjusting the shears toward and from the outlet, and also for adjusting one shear blade with relation to the other, so as to bring the blades into proper shearing relation when they close. The blades 173 are mounted on arms 266 and 267 (Figs. 6, 7 and 17), which oscillate about parallel axes under the front of the forehearth. The left shear blade, as shown in Fig. 17, is fixed on a carrier 268, secured to the arm 266 by a bolt 269, which fixes the blade in predetermined relation to the arm.

Figures 18, 19, 20:
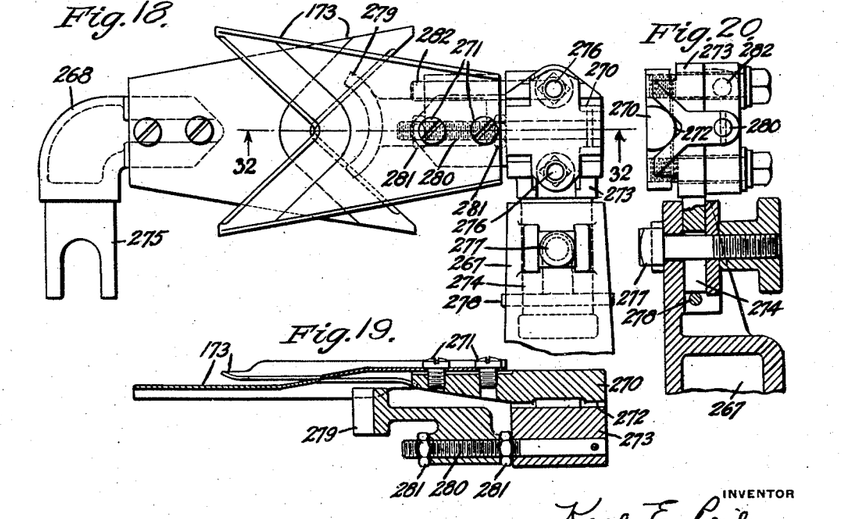
Fig. 18 is a plan view, in larger scale, of the shear blades and their associated mechanism.
Fig. 19 is a front elevation of the shear blades, in section on the line 32—32 of Fig. 18.
Fig. 20 is a side elevation partly in section, of the parts shown in Fig. 18.

The shear blades are of the V-shaped type, having two points of contact where the V-shaped edges cross each other at 180 (Fig. 21) and it is important that the two shear blades shall contact equally at these two points. Provision is therefore made for tilting or swivelling one of the shear blades relatively to the other to insure such equal contact. For this purpose, the right blade, as shown in Fig. 17, is secured to a stud 270 (Figs. 18, 19 and 20) by screws 271. The stud is provided with cylindrical bearing surfaces 272, as shown in Fig. 20, received in V blocks formed on a carrier 273, having a slotted shank 274 adapted to be received in the shear arm 267. The shear blade is tilted by screws 276 passing through clearance holes in the carrier 273 and threaded into ears projecting from the stud 270. By loosening one of these screws and tightening the other, the blade is tilted so as to bring its V edges into proper engaging relation to V edges of its opposite blade, and is held in that position.

The shear blade carrier 273 is clamped in its arm 267 by a screw 277 similar to the screw 269 by which the carrier 268 is secured in the opposite arm 267. A pin 278 forms a stop for the end of the shank 274 of the carrier 273.

One of the features of this invention is a device for steadying the mold charge while being severed, and especially for preventing the lower shear blade from deflecting the upper end of the severed mold charge in the direction of the severing movement of the blade. Such deflection of the upper end of the charge may cause it to be improperly delivered to the mold or chute to which it is dropped. To prevent this, a guide 279 is positioned beneath the blades and connected to move with the upper shear blade. As shown in Figs. 18 and 19, the guide 279 is carried on a threaded stud 280 fixed in the carrier 273. The guide is positioned longitudinally of the stud by nuts 281 by which it may be adjusted toward and from the cutting edge of the shear blade, into proper relation to the side of the mold charge. This construction also provides convenient means for changing the guide 279 to accommodate larger variations in the size or shape of the mold charge than can be accommodated by adjustment of the guide. The guide is prevented from turning about the stud 280 by a pin 282 (Figs. 18 and 20) fixed in the carrier 273 and having a sliding bearing in the guide.

The shear arms 266 and 267 are fixed on the lower ends of shafts 285 and 286 (Figs. 7 and 17) pivotally mounted on the front of the bowl casing 93. The shear arms are connected to move together by gear segments 287 mounted in the forked ends of the respective arms, and in order that the blades may be adjusted so as to meet in any desired portion of the glass, an adjustable connection is provided between at least one of the gear segments 287 and the arms. Preferably each gear segment is provided with a finger 288, which is rigidly connected with its arm by set screws 289 which bear on opposite sides of the finger. By adjusting these screws the relation between the two shear blades may be adjusted so that they will meet at the axis of the outlet, or in the center of the glass to be severed, or elsewhere if desired.

The shears are actuated in their severing movement by a spring 290 connected to the arm 266, and in their opening movement by a link 291 connected by a universal joint with the arm 267. The link 291 is actuated by a shear cam lever 292 (Figs. 6 and 7) pivotally mounted on the box 174. The lever is oscillated in one direction by a cam 293 and in the other by a spring 294. The relation between the shear cam lever 292 and the shear blades may be adjusted so as to cause the blades to cut earlier or later or to provide more or less overlap to the blades in their closed position, by a hand wheel 295 (Figs. 6 and 7) fixed on a right and left screw 296 threaded into and connecting two parts of the link 291. A pointer 297 may be provided to cooperate with graduations on the hub of the hand wheel to indicate the adjustment of the shears.

Means are provided for adjusting one or both of the shear blades vertically toward or from the outlet. When it is desired to change the level of the severing plane so as to cut closer to or farther from the outlet, both shear arms are adjusted together, preserving the cutting relation of the blades to each other. This vertical adjustment is provided for by mounting the shear carrying shafts 285 and 286 in a slide 301 (Figs. 6, 7 and 12) carried in vertical ways formed on the front of the bowl casing 93, in which it is secured by gibs 302. To adjust the slide vertically, the gib screw 303 is loosened and a screw 304 (Fig. 12) is turned. This screw is journaled in a lug 305 formed on the slide 301, and threaded into a boss on the bowl casing 93. By turning the screw, the slide and the entire shear mechanism carried thereby may be raised or lowered.

One effect of thus changing the plane of severance is to modify the shape of the end of the mold charge. For this and other reasons, means are provided for indicating the level of the severing plane. A scale 306 (Fig. 7) is arranged to move with the slide 301 and to be read with reference to the top of the right gib 302. The scale is preferably graduated to indicate the distance from the bottom of the outlet ring 149 (Fig. 1) to the plane of severance, as indicated by the distance X in said figure. Thus the operator is enabled to set the shear blades at the desired level.

Figures 10, 11, 12:
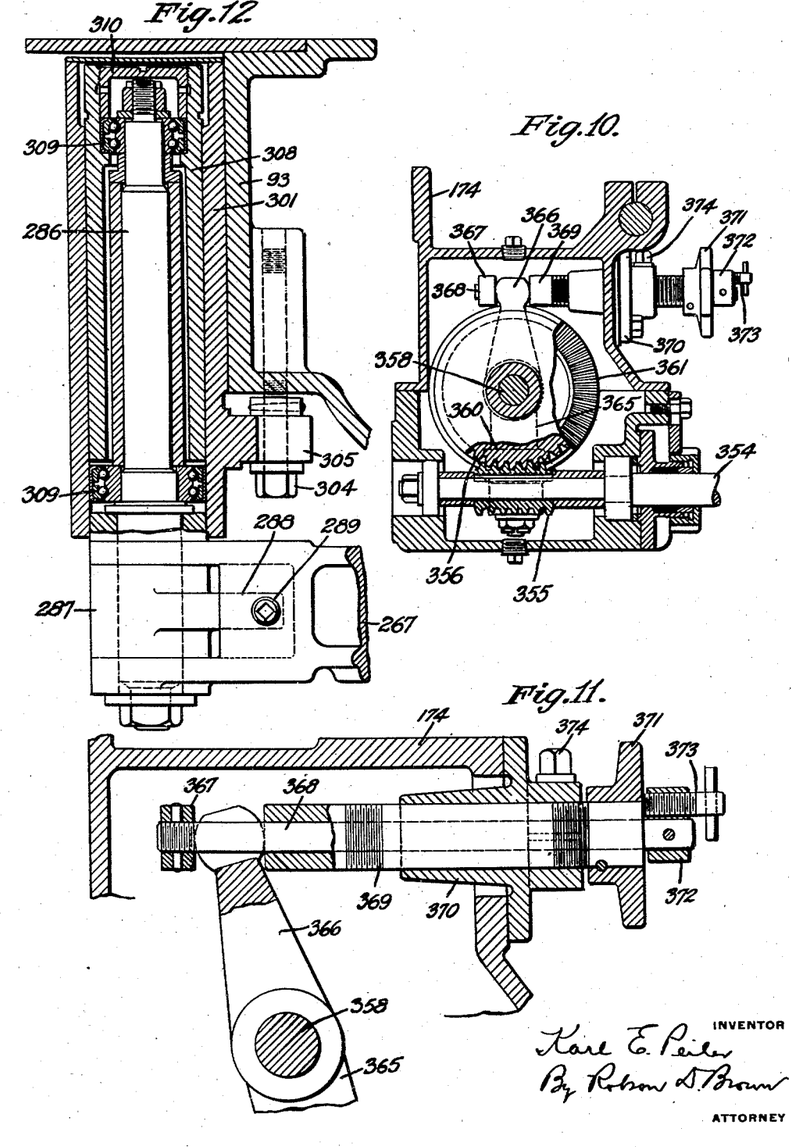
Fig. 10 is a front elevation in section approximately on the line 19—19 of Fig. 8.
Fig. 11 is a front elevation in section on the line 20—20 of Fig. 8.
Fig. 12 is a side elevation in section on the line 21—21 of Fig. 7.

The shaft 285 which carries the shear arm 266 is provided with suitable anti-friction bearings 307 (Fig. 7) mounted directly in the slide 301. To permit adjustment of one of the shear blades so as to bring it in proper shearing relation to the other blade, the shaft 286 which carries the shear arm 267 is not mounted directly in the slide 301, but is carried by a sleeve 308 (Figs. 7 and 12). The shaft 286 is provided with ball bearings 309 which permit it to rock in the sleeve 308, but it is prevented from longitudinal movement by a cap 310 threaded into the sleeve 308, and engaging the top of the upper bearing 309. The sleeve 308 carries a projecting lug 311 (Fig. 7), which is threaded to receive a screw 312 mounted in the slide 301. The screw is provided with a hand wheel 313, by which it may be turned to move the sleeve 308 vertically in the slide 301, thereby adjusting the upper shear blade carried by the arm 267 toward or from the lower blade.

Figure 13:
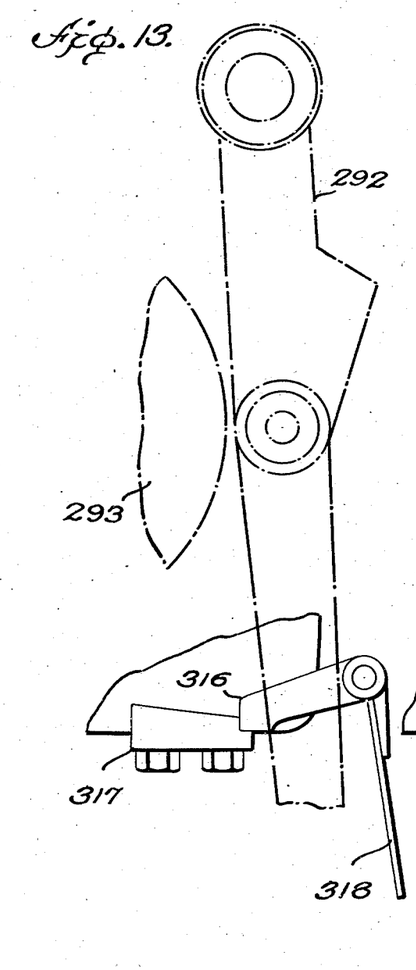
Figs. 13 and 14 are detail views in front elevation, showing the device for holding the shears in inoperative position.
Figure 14:
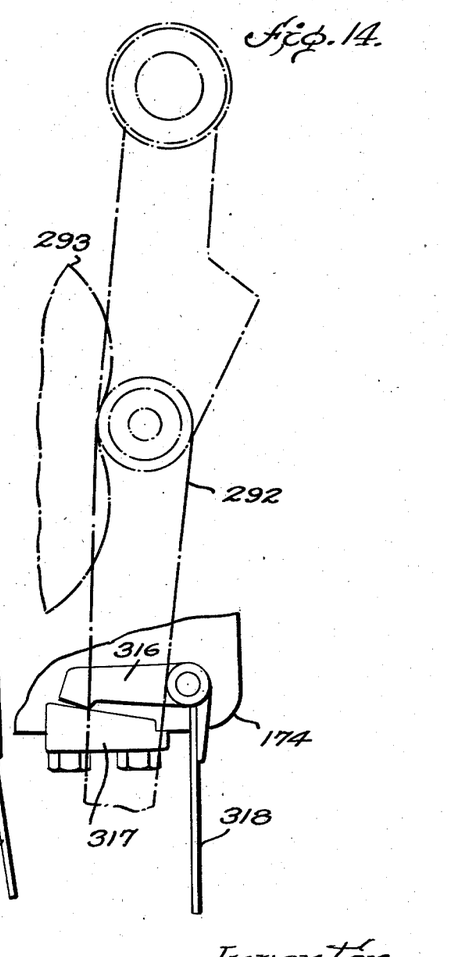

At certain times it is desirable to hold the shear blades in retracted position so as to permit the glass to be discharged without severing mold charges. The shears may be held in inoperative position by a latch 316 (Figs. 7, 13 and 14) pivotally mounted on the shear cam lever 292. During the operation of the shears this latch slides on the top of a plate 317. When it is desired to hold the shears out of operation, the operator moves the shear cam lever 292 slightly further to the right than it is moved by the cam 293, which permits the latch 316 to drop into a notch in the plate 317, as shown in Fig. 26. When the shears are to be thrown into operation again, the lever 292 is swung to the right enough to enable the latch 316 to be lifted from the notch in the plate 317 by means of a depending handle 318, which allows the lever 292 to move into engagement with the cam 293.

Figure 2:
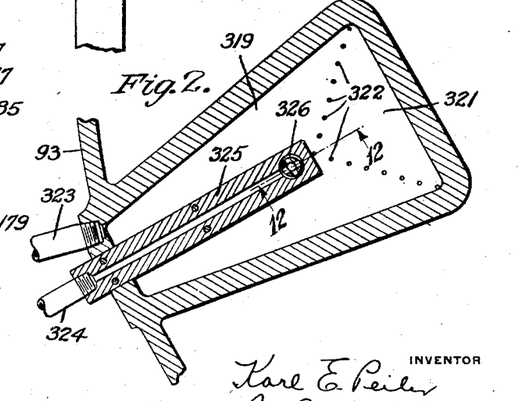
Fig. 2 is a plan view in section on the line 11 of Fig. 1, showing the shear spraying device in larger scale.

Means are provided for cooling the shear blades, and for applying a liquid, preferably oil, thereto. When the shears are open they occupy a position beneath the bowl casing 93, substantially as indicated in Figs. 1 and 6. Each side of the bottom of the bowl casing is provided with an air chamber 319 approximately over each of the blades when they are in open position. The bottom of the chamber is closed by a plate 321 (Figs. 1, 2 and 3), having a series of holes 322 through which air is discharged onto the cutting edge of the blade. The holes are arranged in a V-shape corresponding approximately to the cutting edge of the blade, and the holes are slanted away from the glass outlet on each side, so that the cooling air will be directed away from the discharging glass and toward the outside of the machine, as indicated by the arrow in Fig. 1. Each chamber 319 is connected by a pipe 323 with a source of air pressure, so that all the time the shears are in retracted position they are subjected to a cooling blast of air.

The means for spraying a liquid on the shear blades comprises a pipe 324 supplying the liquid, preferably oil, to a tube 325 attached to each plate 321. The inner end of this tube discharges to a nozzle 326 having a tapered end projecting through a correspondingly tapered opening in the plate 321 (Fig. 3). The nozzle 326 is received in a vertical opening in the end of the tube 325, so that it may be moved toward and from the plate, and it is so adjusted that an annular opening is formed between the nozzle and the plate 321. Air pressure in the chamber 319 causes the oil discharging from the nozzle to take the form of a spray, and directs it onto the shear blades. Suitable regulating mechanism (not shown) may be provided to control the supply of oil to the nozzle and, as the required amount of oil is very small, it is preferred that the oil shall be delivered from the nozzle one drop at a time so as to produce a periodic oil spray.

The shear blades when in working position are not conveniently accessible for adjustment into cutting parallelism with each other, being in the heated environment beneath and close to the forehearth structure. It is therefore, desirable to adjust the blades into proper parallelism for their cutting action before placing them in working position. For this purpose, a blade setting adjunct (Figs. 21, 22, 23) to the machine is provided, which may, if desired, be attached to any convenient portion of the frame work. This blade setting device consists of a block 328 provided with slots 329 and 337 having seats, 335 and 336, for receiving the shanks of the blade carriers 273 and 268. These seats are parallel with each other, thus holding the shanks of the blade carriers in the same parallel relation to each other that they will occupy in working position on the shear arms 266 and 267. For convenience of construction and use, the seats 335 and 336 face upwardly whereas the corresponding seats on the shear arms 266 and 267 face downwardly. Hence the shear blades and carriers when seated on the blade setting device (Figs. 21, 22 and 23) are inverted and also reversed as to the left and right positions they occupy on the shear arms (Figs. 17 and 18), the left hand carrier 268 of Fig. 17 being the right hand carrier of Fig. 21, and vice versa. The setting block 328 is provided with slots 329 and 337, for receiving the shanks 274 and 275 respectively of the carriers 273 and 268, and pins 330 and 340 form stops for the ends of the shanks.

The shank 274 is clamped to its seat 335 by a hand nut 331 threaded on to a stud 332 fixed in the block 328. A spring 333 surrounds the stud so as to lift a washer 334 when the hand nut is loosened so as to facilitate the entrance and removal of the shank.

The other end of the block is provided with a vertically movable slide 338 for receiving the shank 275 of the fixed shear blade carrier 268 which, when assembled in the machine, is the left blade (Fig. 17). The shank 275 is received in a slot 337 in the slide 338, in which it is positioned and secured in the same manner as the other shank 274, that is, by a hand screw 339. The slide 338 is clamped by a bolt 343 and hand nut 341. The slide is adjusted vertically by a screw 342 mounted in the slide and threaded into the block (Fig. 23).

In the use of this device, the adjustable blade carrier 273 is secured in the slot 329, and the screws 276 are loosened so as to permit the stud 270 to tilt on the cylindrical portions 272. The fixed shear blade is then secured by its carrier 268 in the slide 338, which is then adjusted downwardly by the screw 342, bringing the blades together and swinging the adjustable blade into parallelism with the fixed blade, after which the screws 276 are tightened to hold the adjustable blade in that position. Both carriers are then removed from the positioning device and inserted in their respective arms 266 and 267 where the blades will be in exact parallelism and capable of being adjusted to make a clean cut by turning the hand wheel 313 (Fig. 7) to adjust the shear arm 267 vertically and thus bring the blade 173 into proper shearing contact.

The mold charges produced by this and other glass feeding machines are delivered to the molds of shaping machines, which are connected so that the two machines will be driven in synchronism. In some instances, the machines are connected by gearing or other mechanical devices, adjustable so as to deliver the mold charges to the molds at the proper times. In other instances the shaping machines especially, when operated intermittently, are periodically started into operation by pneumatic means, and for use with such shaping machines, the present machine is provided with means consisting of a trip valve 344, for controlling the time of admitting pneumatic pressure to the shaping machine, to put it in operation periodically in proper time relation to the delivery of the mold charges thereto. The valve 344 may be of any well known construction, but it is illustrated herein as comprising a plunger 345 having a port or passage 345ᵃ which is moved into position to connect a pipe 346 leading to a supply of compressed air, with a pipe 347 connected with suitable starting mechanism of the shaping machine, whereby elevation of the plunger will admit air pressure to the starting mechanism to put the shaping machine into operation.

The plunger 345 is lifted by a link 353 connected with a cam lever 348 carrying a cam roll 349 in operative relation to a cam 350, which makes one rotation for each mold charge delivered by the feeder. This cam may be connected with the shear actuating cam 293 (omitted from Fig. 15). In order that the time at which the shaping machine is put into operation may be adjusted with relation to the time of severing and delivering of the mold charge, the cam 350 is split and provided with a clamping screw 351. By loosening this screw, the cam may be turned with relation to the shear cam so as to vary the time of admitting air pressure to the starting mechanism of the shaping machine.

Improved mechanism is provided for adjusting the relative time of operation of two mechanisms driven from the same source of power during the operation of the machine. In the illustrated embodiment of the invention, this adjustment varies the time of occurrence of the plunger movements relative to the time of the severing operations.

Figures 15, 16:
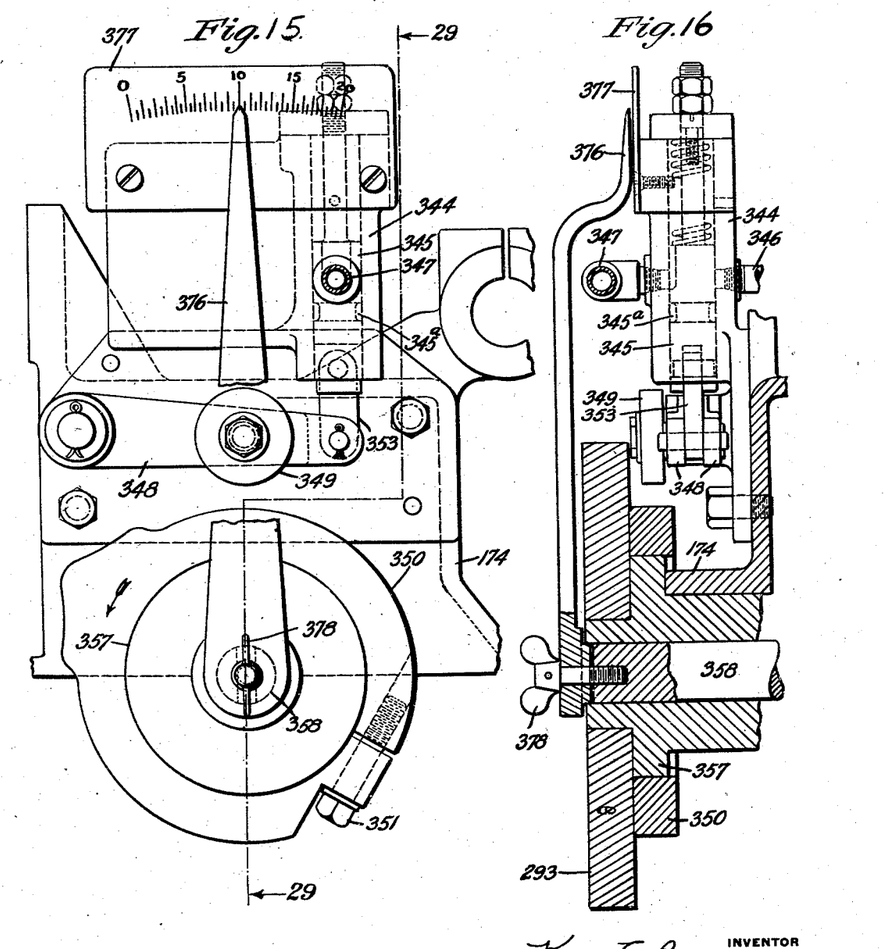
Fig. 15 is a partial front elevation showing a device for synchronizing a shaping machine with the feeder.
Fig. 16 is a side elevation in section on the line 29—29 of Fig. 15.

The charge forming mechanism is driven by a shaft 354 (Figs. 6 and 7) which may be directly connected by suitable gearing with the drive of the associated shaping machine when the latter is mechanically driven. This shaft is mounted in the mechanism box 174 and carries on the inside of the box a worm 355 (Figs. 8 and 10) in engagement with a gear 356. The gear is provided with a sleeve journaled in a bearing in the box 174 and carrying a flange 357 to which the shear cam 293 is attached, and which may also carry the cam 350 for controlling the operation of the associated shaping machine when that machine is pneumatically controlled, as shown in Figs. 15 and 16.

One side of the worm gear 356 carries a bevel gear 359 in engagement with an idle pinion 360, which is in mesh with a bevel gear 361 having a sleeve 362 journaled in a bearing in the box 174 and carrying a flange 363 on which the plunger actuating cam 241 is fixed. The idle pinion 360 is mounted on a hub 365 fixed on the shaft 358, journaled in the gears 359 and 361.

The worm gear 356 and bevel gear 359 rotate in the direction of the arrow (Fig. 8), and through the idler pinion 360, rotating the bevel gear 361 and the cam 241 in the reverse direction. In order to change the angular relation between the two bevel gears 359 and 361, and thereby adjust the relative time of occurrence of the shearing operation by the cam 293, and the movements of the plunger actuated by the cam 241, means are provided for swinging the idle pinion 360 about the axis of the shaft 358. The hub 365 is provided with an arm 366 (Figs. 8, 10 and 11), the forked upper end of which is engaged between a collar 367 fixed on a rod 368, and the end of a tubular screw 369. By adjusting the screw longitudinally, the arm 366 is swung about the axis of the shaft 358 and the idle pinion 360 is moved to change the relative position of the two bevel gears driven thereby. The screw 369 is threaded through a cap 370 fixed on the box 174, and is provided with a hand wheel 371. To clamp the arm 366 in its adjusted position between the collar 367 and the end of the screw 369, the rod 368 carries a fixed collar 372 threaded to receive a set screw 373, which may be tightened to clamp the end of the arm 366 firmly between the two engaging surfaces, thereby insuring stability and exactly timed movement of the plunger and other parts. The cap 370 is split and provided with a clamp screw 374 to lock the tubular screw 369 in position.

In order that the relation between the time of operation of the shears and the plunger may be predetermined and set so as to obtain results in accordance with previous experience, the machine is provided with an indicator by which the time relation of the two parts is visibly indicated. The end of the shaft 358 (Figs. 8, 15 and 16) carries a pointer 376 cooperating with a scale 377 fixed on the machine and graduated with suitable index characters to enable previously determined settings of the timed relation to be reproduced. When the arm 366 is adjusted by the hand wheel 371, the pointer 376, being fixed on the shaft 358 is correspondingly moved over the scale. In order that the pointer may be conveniently removed, to facilitate the removal of the cams 293 or 350, it is connected with the end of the shaft 358 by a key, and clamped by a wing screw 378.

The operation of the feeder will be apparent from the description of its parts. The means for forming, suspending and separating the glass into mold charges is capable of all necessary adjustments without interrupting the continuous operation of the machine.

Certain features illustrated and described in connection with the present invention, form a part of the subject matter of my co-pending appplications Serial Nos. 294,792 and 541,639.

The illustrated embodiment of the invention has been selected for the purpose of illustration only, and the details of construction and arrangement illustrated and described may be modified in various ways within the scope of the appended claims.

I claim as my invention:

1. Apparatus for separating molten glass into mold charges, comprising a glass severing blade, and a guide to steady the charges while severed, the guide being movable with the blade but supported for adjustment relative to the blade.

2. Apparatus for separating molten glass into mold charges, comprising a glass severing blade, and a guide to steady the charges during severance, the guide being movable with the blade but supported for adjustment in directions parallel with the operating movement of the blade.

3. Apparatus for separating molten glass into mold charges, comprising a pair of overlapping glass severing blades, and a mold charge guide mounted for movement with the upper blade and spaced therefrom so as to permit the lower blade to pass between them.

4. Apparatus for separating molten glass into mold charges, comprising a movable glass severing blade adjustable to different angular positions, and a guide for the mold charges movable with the blade and having a fixed angular position.

5. Apparatus for separating molten glass into mold charges, comprising a glass severing blade, a guide having a fixed position relative to the blade during the severing operation, and being adjustable toward and from the cutting edge of the blade.

6. Apparatus for separating molten glass into mold charges, comprising a blade movable toward and from a suspended mold charge, a guide on the opposite side of the charge from the blade, means for moving the guide toward and from the charge, and means for adjusting the position of the guide relative to the charge at the time of severing.

7. In apparatus for separating molten glass into mold charges, the combination of a shear blade and a carrier therefor, provided with means for adjusting the angular relation between the blade and its carrier about an axis substantially parallel with the direction of cutting movement of the blade.

8. Apparatus for separating molten glass into mold charges, comprising a pair of V-shaped shear blades, and carriers therefor, provided with means for tilting one of the blades relative to its carrier about an axis substantially parallel with the direction of cutting movement of the blade to adjust its V-shaped edge into cutting contact with the V-shaped edge of the other blade at a plurality of places along the cutting edges of the blades.

9. Apparatus for separating molten glass into mold charges, comprising a shear blade and a carrier in which the blade is mounted for adjustment about an axis substantially parallel with the direction of the cutting movement of the blade.

10. Apparatus for separating molten glass into mold charges, comprising a pair of shear blades, an arm for each blade, means for attaching one of said blades to its arm in fixed relation thereto, and means for attaching the other blade to its arm for adjustment relatively to its arm about an axis substantially parallel with the direction of cutting movement of the blade.

11. Glass severing mechanism comprising a pair of pivoted arms provided with shear blades, gears connecting the arms to move them in synchronism, and means for adjusting the relation between the gears and arms to vary the relative positions of the blades.

12. Glass severing mechanism comprising a pair of pivotally mounted arms carrying shear blades, gears connecting the arms to swing them toward and from each other, and means for adjusting the angular relation between the gears and their respective arms.

13. Glass severing mechanism comprising a pair of arms provided with intermeshing gears mounted to swing about substantially parallel axes, and means for connecting the gears with their respective arms, at least one of the connections being adjustable.

14. Glass severing mechanism comprising a pair of shear blades, means for actuating the blades to sever glass, a slide carrying the blades and movable to vary their severing plane, and means for adjusting one of the shear blades vertically relative to the other blade.

15. Apparatus for separating molten glass into mold charges, comprising a pair of shear blades, a vertically adjustable slide carrying the blades, and provided with means for adjusting one of said blades vertically, independently of the other blade.

16. Apparatus for separating molten glass suspended from a furnace outlet into mold charges, comprising a pair of shear blades, means for effecting adjustment of one of the blades toward and from the outlet independently of the other blade, means for adjusting both blades together toward and from the outlet, and graduated means for visibly indicating the distance between the outlet and the shearing plane after each adjustment of said last named adjusting means.

17. Severing mechanism for molten glass comprising a pair of cooperating shear blades carried by swinging arms pivoted on parallel axes, and means for moving one arm axially relative to the other to adjust the cutting relation of the blades.

18. Apparatus for separating molten glass into mold charges, comprising a shear blade, means for producing a continuous discharge of air toward the blade, and means for periodically supplying oil to said air discharge so as to produce a periodic oil spray on said knife.

19. In apparatus for separating molten glass into mold charges, a glass container having a downwardly opening outlet in its bottom, a shear blade operating periodically below the outlet for severing mold charges from glass discharged through the outlet, and means adjacent to the path of movement of the shear blade for discharging a cooling blast onto the shear blade in a direction inclined away from the axial line of the outlet.

20. Glass severing mechanism including a movable arm carrying a shear blade, an operating mechanism for said arm including a cam lever and a cam for actuating the cam lever, a latch carried by said cam lever, and means cooperable with said latch when said lever has been swung clear of said cam to prevent return movement of the cam lever toward said cam, whereby said shear blade will be maintained inoperative.

21. In glass working apparatus, a device for setting a pair of carrier supported shear blades on their carriers so that the shear blades will be parallel with each other when the carriers are secured in operative position, one of said shear blades being angularly adjustable on its carrier, comprising a block, means for immovably supporting one of said carriers on the block, means for movably supporting the other carrier on the block so that the shear blades overlap, and means for adjusting the second carrier on the block until the overlapping portions of the shear blades contact flatly with each other.

22. A pre-setting device for a pair of carrier supported shear blades, one of said shear blades being angularly adjustable relatively to its carrier, comprising a block, a slide movable mounted on the block, means for securing one of said carriers to the block so that the shear blade on the said carrier is turned toward the slide, means for securing the second carrier to said slide so that the blade of the second carrier overlaps the blade of the first carrier, and means for adjusting said slide relatively to said block to cause the overlapping portions of said blades to contact flatwise with each other.

23. In a glass feeder, a glass severing mechanism comprising a pair of arms provided with shear blades and mounted to swing toward and from each other, means connecting the arms to swing them simultaneously, and means for operating said arms to effect intermittent cutting actions by said blades, said operating means comprising a cam, a cam lever operated by the cam, and a rod connecting the cam lever and one of said shear arms and provided with means whereby the effective length of said connecting rod can be varied.

24. In apparatus for severing molten glass into mold charges, a pair of cooperative shear blades, a pair of pivoted shear arms carrying said shear blades and adapted to swing toward and away from each other, means connecting said shear arms whereby swinging movement of either shear arm will cause a reverse swinging movement of the other shear arm, power actuated means directly connected to one of said shear arms for causing periodic swinging movements of said shear arms, and resilient means connected with the other shear arm for causing return swinging movements of said shear arms after each actuation thereof by said power actuated means.

Signed at Hartford, Connecticut, this 16th day of November, 1925.

KARL E. PEILER.